No. 895,716.
PATENTED AUG. 11, 1908.
A. BENTON & C. D. JORDAN.
FENDER FOR CULTIVATORS.
APPLICATION FILED NOV. 25, 1907.
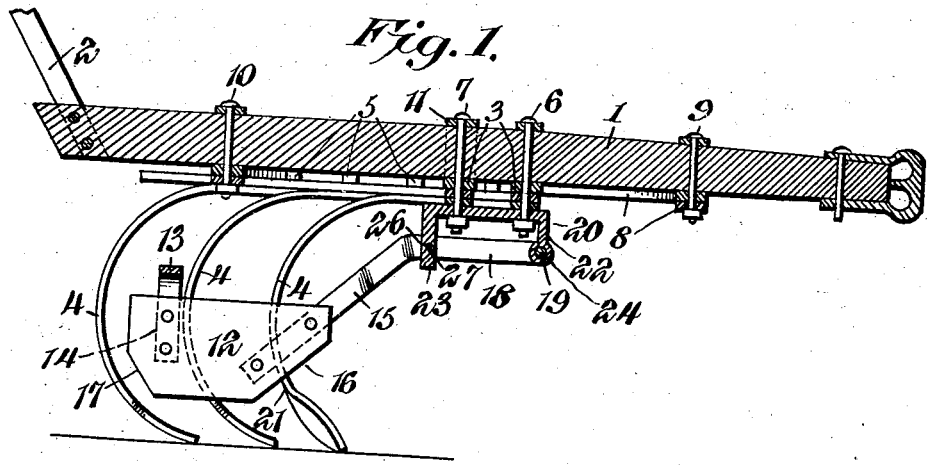
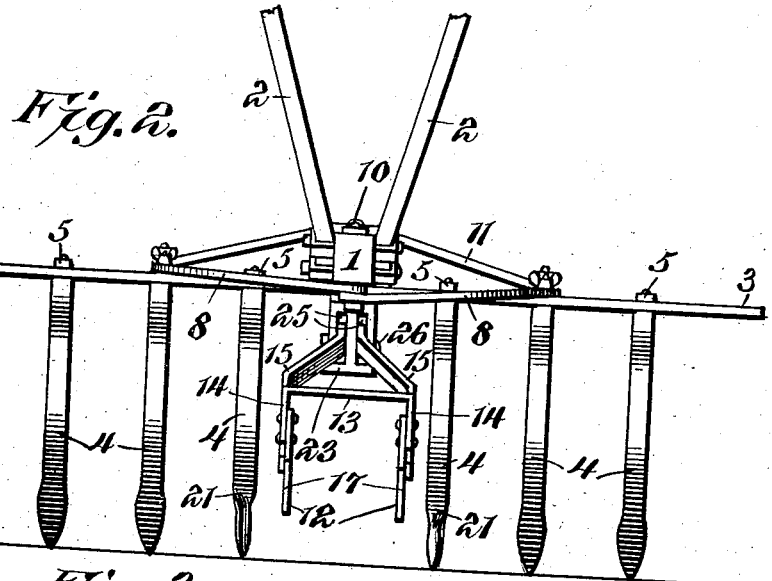
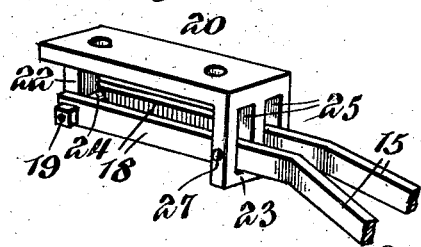
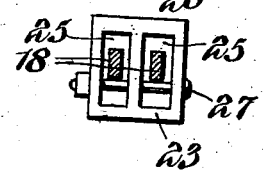
Witnesses
Howard D. Orr
H. F. Riley
Abba Benton
and Charles D. Jordan, Inventors,
By E. G. Siggers
Attorney

UNITED STATES PATENT OFFICE.

ABBA BENTON AND CHARLES D. JORDAN, OF MONTICELLO, GEORGIA.

FENDER FOR CULTIVATORS.

No. 895,716.      Specification of Letters Patent.      Patented Aug. 11, 1908.

Original application filed August 5, 1907, Serial No. 387,161. Divided and this application filed November 25, 1907.
Serial No. 403,752.

*To all whom it may concern:*

Be it known that we, ABBA BENTON and CHARLES D. JORDAN, citizens of the United States, residing at Monticello, in the county of Jasper and State of Georgia, have invented a new and useful Fender for Cultivators, of which the following is a specification.

The present application is a division of the application filed by us Aug. 5, 1907, Serial No. 387,161, and the invention relates to a fender for cultivators.

The object of the present invention is to provide a fender designed for use on spring tooth cultivators, and capable of a limited upward and downward movement to prevent it from becoming clogged with stones and clods, and adapted to protect young plants and to effectually prevent the same from being injured by the soil being thrown inwardly by the cultivator teeth.

The invention also has for its object to provide a fender of this character, adapted, as the plants increase in size, to be adjusted to prevent them from being injured by the fender.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a longitudinal sectional view of a cultivator provided with a fender, constructed in accordance with this invention. Fig. 2 is a rear elevation of the same. Fig. 3 is a detail perspective view, illustrating the construction of the bracket or support for the arms of the fender. Fig. 4 is a rear elevation of the same, the arms of the fender being in section.

Like numerals of reference designate corresponding parts in all the figures of the drawing.

1 designates a beam, which is equipped at its rear end with handles 2, secured to the side faces of the beam by suitable fastening means. Extending laterally from the beam at a point intermediate of its ends are bars 3, to which the cultivator teeth 4 are secured by bolts 5, or other suitable fastening devices. The laterally extending bars, which are secured at their inner ends to the beam by bolts 6 and 7, are arranged in pairs and are held against pivotal movement by side braces 8. The side braces are secured to the beam by front and rear bolts 9 and 10, and the said bars 3 are also braced by a transverse bar 11, centrally secured to the upper face of the beam by the bolt 7 and connected at its ends to the side braces.

The cultivator teeth are located at opposite sides of and spaced from the beam and the fender, which is adapted to prevent the cultivator teeth from throwing the soil upon and injuring the young plants.

The fender is composed of a pair of longitudinal blades 12, arranged in parallelism and connected at their rear ends by a transverse brace 13, having its terminals 14 bent downwardly at right angles and secured by rivets, or other suitable fastening devices to the blades 12. The blades are provided at their front portions with arms 15, having inclined portions secured to the outer faces of the blades by rivets, or other suitable fastening devices. The blades of the fender have their lower front and rear corners cut away to form front and rear inclined edges 16 and 17. The arms 15 converge forwardly and upwardly and are provided with straight horizontally disposed front portions 18, arranged in parallelism and pivoted at their front terminals by a transverse bolt 19 to the front of a bracket or support 20. The transverse brace 13 and the front inclined arms 15 maintain the blades in parallelism and in proper position with relation to the cultivator teeth. The innermost cultivator teeth are provided at intermediate points between their ends with twists or bends 21, which set the lower soil-engaging portions of the teeth at an angle to the upper or shank portions of the same. These angularly disposed soil-engaging portions, which are disposed diagonally with relation to the line of draft of the cultivator, are adapted to throw the soil towards the plants.

The fender blades, which are located between the innermost cultivator teeth, protect the young plants and prevent the same from being covered or injured by the soil.

The bracket or support 20 consists of a top plate or portion, provided at its front end with a depending lug 22 and having a rear transverse portion 23. The top plate or portion is arranged beneath the beam and is connected with the same by means of the bolts 6 and 7, which rigidly hold the bracket or support in position. The bracket or support is also adapted to be secured to either set or pair of laterally extending bars so as to throw the beam to one side of the fender to prevent the draft animal or animals from tramping on young plants. The front lug 22 is provided at its lower end with an eye 24 for the reception of the transverse bolt 19, and the rear portion 23 is provided at opposite sides of its center with vertical openings 25, in which the front horizontal portions of the arms of the fender blades have a limited upward and downward movement to permit the fender blades to ride over stones and clods, and to prevent the fender blades from becoming clogged by the same. This limited upward and downward movement enables the fender to effectually protect the plants, while preventing the former from becoming clogged. The upward and downward movement may be further restricted by placing a pin 26 beneath the arms of the fender, as illustrated in Fig. 4 of the drawing. The pin 26, which limits the downward movement of the fender, is passed through the transverse portion 23 of the bracket or support, suitable perforations 27 being provided near the bottom thereof for this purpose. This construction is designed to permit the fender to be used on larger plants without crushing, or otherwise injuring the same. When the plants increase in size and are too large to be safely operated on by the fender in its lowermost position, the pin 26 is placed beneath the fender arms 15 and will limit the downward movement of the same, thereby preventing the fender blades from coming in contact with the plants.

Having thus fully described our invention, what we claim as new and desire to secure by Letters Patent, is:—

1. The combination with a beam, cultivating devices, and means for connecting the same to the beam, of a rigidly mounted bracket or support located beneath the beam and connected with the same by the means for connecting the cultivating devices with the said beam, and a fender composed of spaced blades and provided with arms pivoted to the bracket or support, said bracket or support being provided with means for permitting a limited upward and downward movement of the fender blades.

2. The combination with a beam, cultivating devices, and means for connecting the same with the beam, of a bracket or support located beneath the beam and composed of a top plate, an integral front lug depending from the top plate, and an integral rear transverse portion extending downwardly from the top plate and provided with vertical openings, a fender having spaced blades and provided with arms extending through the openings of the transverse rear portions of the bracket or support and pivoted to the front lug, said arms being capable of an oscillatory upward and downward movement in the said openings, and means for limiting the upward and downward movement in the openings.

3. The combination with a beam, cultivating devices, and means for connecting the same with the beam, of a bracket or support composed of a top plate, a front lug depending from the top plate, and a rear transverse portion extending downwardly from the top plate and provided with vertical openings, a fender having spaced blades and provided with arms extending through the openings of the transverse rear portion of the bracket or support and pivoted to the front lug, said arms being capable of an oscillatory upward and downward movement in the said openings, and a transverse pin extending across the transverse rear portion of the bracket or support and located beneath the arms for limiting the downward movement thereof.

4. The combination with spaced fender blades having arms, of a bracket provided with vertical openings receiving the arms of the fender blades and permitting the same to move upwardly and downwardly, a pivot mounted on the bracket and pivoting the said arms to the same, and means for securing the bracket to a cultivator.

5. The combination of a bracket provided with an eye and having a transverse portion located in rear of the eye and having vertical openings, and a fender provided with arms extending through the said openings and movable upwardly and downwardly in the same, a pivot passing through the said eye and pivoting the arms to the bracket, and means for securing the bracket to a cultivator.

6. A fender supporting bracket consisting of a top plate, a lug depending from the front portion of the top plate and provided with an eye, and a transverse portion depending from the top plate in rear of the lug and provided with vertical openings, said transverse portion being also provided with a pin-receiving perforation located at a point between the upper and lower ends of the said openings.

7. The combination of a bracket provided with an eye and having a transverse portion located in rear of the eye, said transverse portion being provided with a vertical opening, a fender having an arm extending through the said opening and movable upwardly and downwardly in the same, a pivot passing through the eye and pivoting the arm to the bracket, and means for securing the bracket to a cultivator.

In testimony, that we claim the foregoing as our own, we have hereto affixed our signatures in the presence of two witnesses.

ABBA BENTON.
CHARLES D. JORDAN.

Witnesses:
CHAS. E. WELLINGTON,
O. O. BANKS.